(12) United States Patent
Simone et al.

(10) Patent No.: US 10,688,517 B2
(45) Date of Patent: Jun. 23, 2020

(54) APPARATUS AND METHOD FOR COATING PIPELINES

(71) Applicant: SAIPEM S.p.A., San Donato Milanese (IT)

(72) Inventors: Francesco Simone, San Donato Milanese (IT); Joseph Crichton Duncan, San Donato Milanese (IT); Valerio Muratori, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 0 days.

(21) Appl. No.: 15/748,463

(22) PCT Filed: Jul. 29, 2016

(86) PCT No.: PCT/IB2016/054581
§ 371 (c)(1),
(2) Date: Jan. 29, 2018

(87) PCT Pub. No.: WO2017/017658
PCT Pub. Date: Feb. 2, 2017

(65) Prior Publication Data
US 2018/0264499 A1 Sep. 20, 2018

(30) Foreign Application Priority Data
Jul. 30, 2015 (IT) .................. 102015000040491

(51) Int. Cl.
*B05B 13/04* (2006.01)
*B05C 9/14* (2006.01)
(Continued)

(52) U.S. Cl.
CPC ........ *B05B 13/0436* (2013.01); *B05B 7/1486* (2013.01); *B05C 9/14* (2013.01);
(Continued)

(58) Field of Classification Search
None
See application file for complete search history.

(56) References Cited

U.S. PATENT DOCUMENTS

| | | | |
|---|---|---|---|
| 3,659,555 | A | 5/1972 | Malivoir |
| 4,595,607 | A | 6/1986 | Betteridge et al. |

(Continued)

FOREIGN PATENT DOCUMENTS

| | | | |
|---|---|---|---|
| EP | 1 514 609 | A2 | 3/2005 |
| EP | 2 535 168 | A1 | 12/2012 |

(Continued)

OTHER PUBLICATIONS

Notification Concerning Submission, Obtention or Transmittal of Priority Document for International Application No. PCT/IB2016/054581 dated Oct. 25, 2016.

(Continued)

*Primary Examiner* — Jethro M. Pence
(74) *Attorney, Agent, or Firm* — Neal, Gerber & Eisenberg LLP

(57) ABSTRACT

An apparatus configured to coat pipelines, in particular a cutback along a pipeline, having: a frame, which extends along a designated axis and is fixable with respect to the pipeline so as to arrange the designated axis parallel to the longitudinal axis of the pipeline; a carriage, which is supported by the frame, is movable along the designated axis with respect to the frame, and is configured to designated a heater and an applicator; an actuator configured to advance the carriage along the designated axis; and a control unit configured to select a travel distance for the carriage from a plurality of travel distances.

21 Claims, 4 Drawing Sheets

(51) Int. Cl.
*F16L 58/10* (2006.01)
*F16L 58/18* (2006.01)
*B05B 7/14* (2006.01)

(52) U.S. Cl.
CPC ......... *F16L 58/1072* (2013.01); *F16L 58/181* (2013.01); *B05D 2254/02* (2013.01)

(56) References Cited

U.S. PATENT DOCUMENTS

| | | | |
|---|---|---|---|
| 5,186,755 | A | 2/1993 | Carlson, Jr. et al. |
| 5,352,292 | A | 10/1994 | Thomas |
| 5,725,668 | A | 3/1998 | Foster et al. |
| 9,415,426 | B1* | 8/2016 | Blake .................. B08B 9/023 |
| 2014/0370200 | A1* | 12/2014 | Krutzen ............. B05B 13/0436 427/427.1 |
| 2015/0107512 | A1* | 4/2015 | Taylor .................. B05B 7/0408 118/697 |

FOREIGN PATENT DOCUMENTS

| | | |
|---|---|---|
| EP | 2 783 756 A2 | 10/2014 |
| GB | 2 285 592 A | 7/1995 |
| WO | WO 2008/071773 A2 | 6/2008 |
| WO | WO 2009/024755 A1 | 2/2009 |
| WO | WO 2011/162747 A1 | 12/2011 |
| WO | WO 2013/115646 A1 | 8/2013 |

OTHER PUBLICATIONS

International Search Report and Written Opinion for International Application No. PCT/IB2016/054581 dated Jan. 26, 2017.
PCT Demand for International Preliminary Examination and Reply to International Search Report and the associated Written Opinion for International Application No. PCT/IB2016/054581 dated May 26, 2017.
Notification of Receipt of Demand by Competent International Preliminary Examining Authority (Form PCT/IPEA/402) for International Application No. PCT/IB2016/054581 dated Jun. 2, 2017.
Second Written Opinion for International Application No. PCT/IB2016/054581 dated Oct. 6, 2017.
Reply to the Second Written Opinion for International Application No. PCT/IB2016/054581 dated Dec. 6, 2017.
Notification of Transmittal of the International Preliminary Report on Patentability (Form PCT/IPEA/416) for International Application No. International Application No. PCT/IB2016/054581 dated Jan. 29, 2018.

* cited by examiner

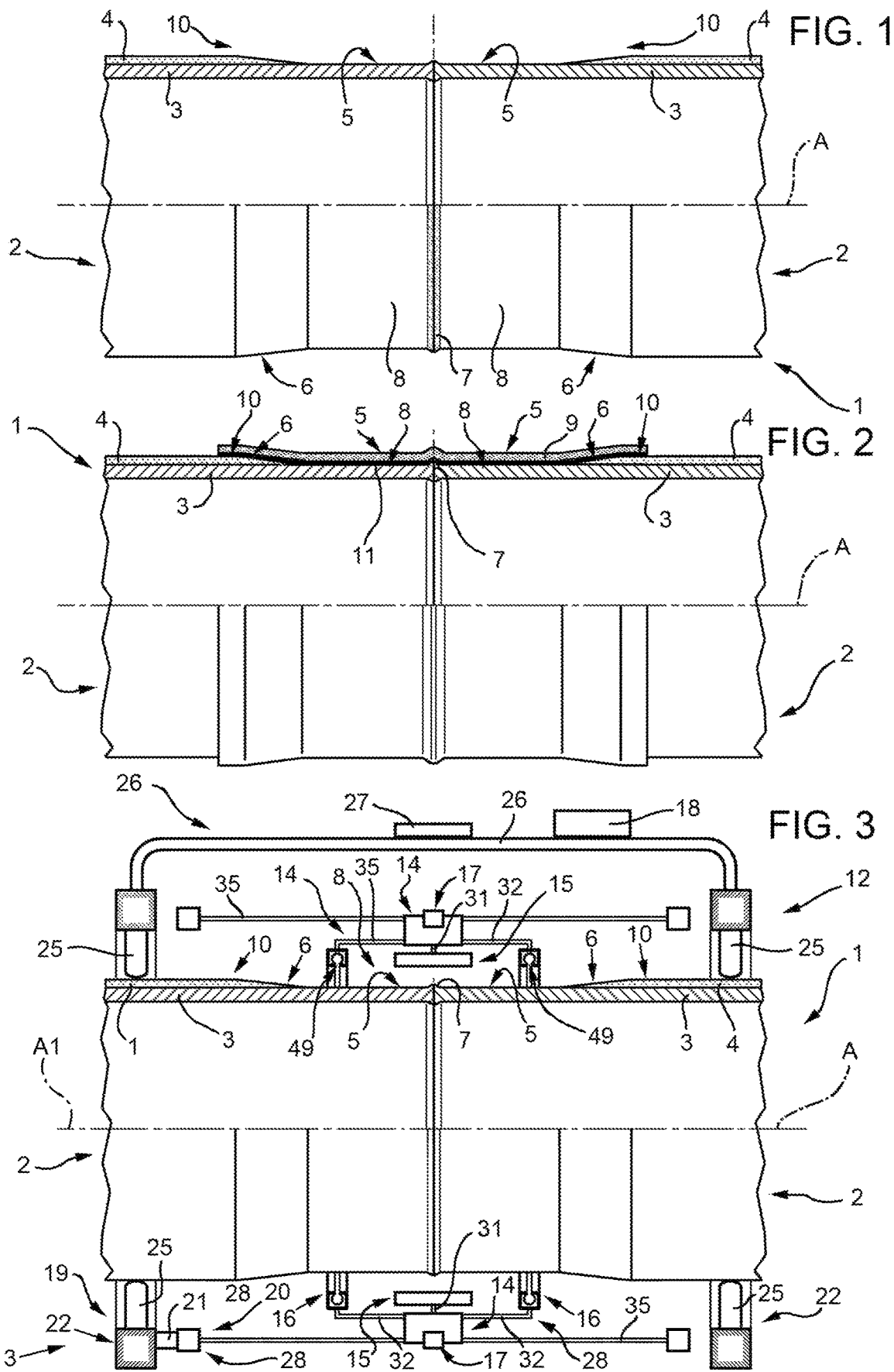

APPARATUS AND METHOD FOR COATING PIPELINES

PRIORITY CLAIM

This application is a national stage application of PCT/IB2016/054581, filed on Jul. 29, 2016, which claims the benefit of and priority to Italian Patent Application No. 102015000040491, filed on Jul. 30, 2015, the entire contents of which are each incorporated by reference herein.

TECHNICAL FIELD

The present disclosure relates to an apparatus configured to coat pipelines.

In particular, the present disclosure relates to an apparatus configured to heat a cutback (annular joint portion) and deposit a coating on the cutback of a pipeline configured to transport hydrocarbons.

BACKGROUND

The pipes for transporting hydrocarbons are composed of pipe sections joined together to cover overall lengths in the order of hundreds of kilometres. The pipe sections have a unit length, generally 12 meters, and relatively large diameters of between 0.2 meters and 1.5 meters. Each pipe section comprises a steel cylinder, a coating in a polymer material that has the function of protecting the steel pipe, and a possible further coating in Gunite or concrete, the function of which is to weigh down the pipeline for underwater applications, or a further coating in an insulating material to thermally insulate the pipeline.

To enable welding the steel cylinders together, the opposite free ends of each pipe section have no coating. The pipe sections are joined to one another both in land installations to form lengths of pipe that are multiples of the unit length, and in laying vessels, where the pipe sections, of unit length or multiples thereof, are joined to lengths of pipe already joined to other lengths of pipe to form part of the underwater pipeline.

The joining operations envision welding the steel cylinders, usually in several welding passes, and restoring the coating.

Once a welding bead ring has been completed between two steel cylinders, an uncoated cutback straddles the weld. The cutback is basically the annular joint portion defined by the free ends of the pipe sections and extending axially between two end edges of the coating, and must be covered by a protective coating.

Application of the protective coating on the cutback is known as field joint coating and, in general, includes coating the cutback with three layers designed to ensure protection of the steel cylinders and the adhesion of these layers thereto. Field joint coating on the cutback includes: heating, by induction for example, the cutback up to a temperature in the range 160° C.-250° C.; coating the cutback with a fusion bonded epoxy (FBE) resin that forms, on contact with the cutback, a first, relatively thin layer, known as the primer; spraying on the cutback, on top of the primer, a modified copolymer with an adhesive function that forms, in contact with the primer, a second relatively thin layer; and applying a third coat, generally known as the top coat.

In general, the first layer, or primer, is applied by a cylindrical inductor, which is placed around the cutback and structured like a clamp, and an applicator that is movable with respect to the outer surface of the cutback to apply a polymer material on the cutback. Some examples of apparatuses for coating pipelines that enable heating the pipeline with a cylindrical inductor and applying the first layer in quick succession are described in PCT Patent Application No. WO 2009/024,755 and U.S. Pat. No. 4,595,607. Certain known apparatuses of the above-indicated type suffer from the drawback of not being adaptable to cutbacks of different length and, in consequence, for design reasons it is often necessary to have a plurality of coating apparatuses. PCT Patent Application No. WO 2013/115646 and PCT Patent Application No. 2011/162747 disclose apparatuses, which control applicators for applying coating to pipelines. However, these documents fail teaching how to heat the pipeline.

SUMMARY

The advantage of the present disclosure is to provide an apparatus configured to coat a pipeline that is devoid of certain of the drawbacks of certain of the known art.

In accordance with the present disclosure, an apparatus configured to coat pipelines, in particular cutbacks along a pipeline, is provided, the apparatus comprising:
  a frame, which extends along a designated or given axis and is fixable with respect to the pipeline so as to arrange the designated axis parallel to the longitudinal axis of the pipeline;
  at least one carriage, which is supported by the frame, is movable along the designated axis with respect to the frame, and is configured to support a heater and an applicator;
  a heater supported by the carriage;
  an applicator supported by the carriage;
  at least a first actuator configured to advance the carriage along the designated axis; and
  a control unit configured to select a travel distance for the carriage from a plurality of travel distances.

With the present disclosure, the heater and the applicator can be advanced along the longitudinal axis of the pipeline and implement a kind of scanning of the outer surface of the pipeline and for a travel distance that can be selected as needed.

In particular, the frame comprises a first frame portion fixable with respect to the pipeline; a second frame portion supported in a rotatable manner about the designated axis by the first frame portion; and a second actuator configured to rotate the second frame portion with respect to the first frame portion about the designated axis. The rotation of the second frame portion with respect to the first frame portion enables using non-annular heaters and applicators, which thus perform a scan of the cutback in both the axial direction and the annular direction.

In particular, the first frame portion comprises two first opposing heads connected to one another, and configured to being arranged around, and clamped to, the pipeline; in particular, each head comprises a fixed part and an arm hinged to the fixed part and selectively movable between an open and a closed position. The clamping of the first frame portion on the pipeline enables handling the movements of the heater and the applicator with reference to the pipeline.

In particular, the first frame portion comprises a support structure connected to the two first heads and configured to keep the first heads a designated or given distance apart. This distance is selected so as to contain all the possible travel distances of the carriage. In particular, the first frame portion comprises a coupling for a manipulator. Due to this solution, the movement of the apparatus is relatively very quick and accurate.

In particular, the second frame portion comprises two second opposing heads connected to one another by guides, which are slidably engaged by the carriage. The guides have the dual function of guiding the carriage and supporting the second heads at a designated or given distance apart.

In particular, each second head is shaped like an open ring, the opening being such as to enable fitting the frame around the pipeline. In practice, the second frame portion does not obstruct fitting the frame around the pipeline.

In particular, the carriage comprises: a main body; a first mounting member configured to support a heater or an applicator; and a second mounting member configured to support an applicator or a heater.

The carriage supports a heater and an applicator in an independent manner.

In particular, the first mounting member and/or the second mounting member are mounted in a selectively movable manner along the main body in a radial direction with respect to the designated axis.

In these embodiments, adjustment of the mounting members is independent.

Advantageously, the first actuator comprises a screw nut mounted on the carriage and a threaded rod supported by the frame.

A further advantage of the present disclosure is to provide a method free of certain of the drawbacks of certain of the known art.

In accordance with the present disclosure, a method is provided for coating pipelines, in particular for coating cutbacks along a pipeline, the method comprising the steps of:
fixing a frame extending along a designated or given axis with the respect to the pipeline so as to arrange the designated axis parallel to the longitudinal axis of the pipeline;
advancing a heater and an applicator in relatively quick succession along the frame parallel to the designated axis by carriage; and
selecting the travel distance for the heater and the applicator from a plurality of travel distances.

With the present disclosure, it is possible to select the size of the area on which to apply the coating as needed.

In particular, the method provides for rotating the heater and/or the applicator about the designated axis along a designated or given path. In this way, heaters and applicators that do not extend around the pipeline can also be used.

In particular, the method provides for fitting the frame around the pipeline in a radial direction with respect to the longitudinal axis of the pipeline.

The fitting and removal of the frame in the radial direction are facilitated when heaters and applicators that extend around the pipeline are not used, as their disassembly is not required.

In particular, the method provides for clamping the frame on the pipeline. In this way, it is possible to accurately control the position of the heater and the applicator with respect to the pipeline.

In particular, the method provides for adjusting the position of the heater with respect to frame in a radial direction with respect to the designated axis. This adjustment enables choosing the distance that enables achieving an efficient heating treatment. In addition, this adjustment enables adapting the position of the heater to pipelines of different diameters.

In particular, the method provides for adjusting the position of the applicator with respect to the frame in a radial direction with respect to the designated axis. This adjustment enables choosing the distance that enables achieving an efficient application treatment and adapting the position of the applicator for different diameters.

Additional features and advantages are described in, and will be apparent from the following Detailed Description and the figures.

BRIEF DESCRIPTION OF THE DRAWINGS

Further characteristics and advantages of the present disclosure will become clear from the description that follow of a non-limitative embodying example, with reference to the figures of the accompanying drawings, in which:

FIG. 1 is a side elevation view, with parts in section and parts removed for clarity, of a pipeline;

FIG. 2 is a side elevation view, with parts in section and parts removed for clarity, of the pipeline;

FIG. 3 is a schematic side elevation view, with parts in section and parts removed for clarity, of the pipeline in FIG. 1 and of an apparatus for coating the pipeline;

DETAILED DESCRIPTION

The Pipeline

Figure 4:
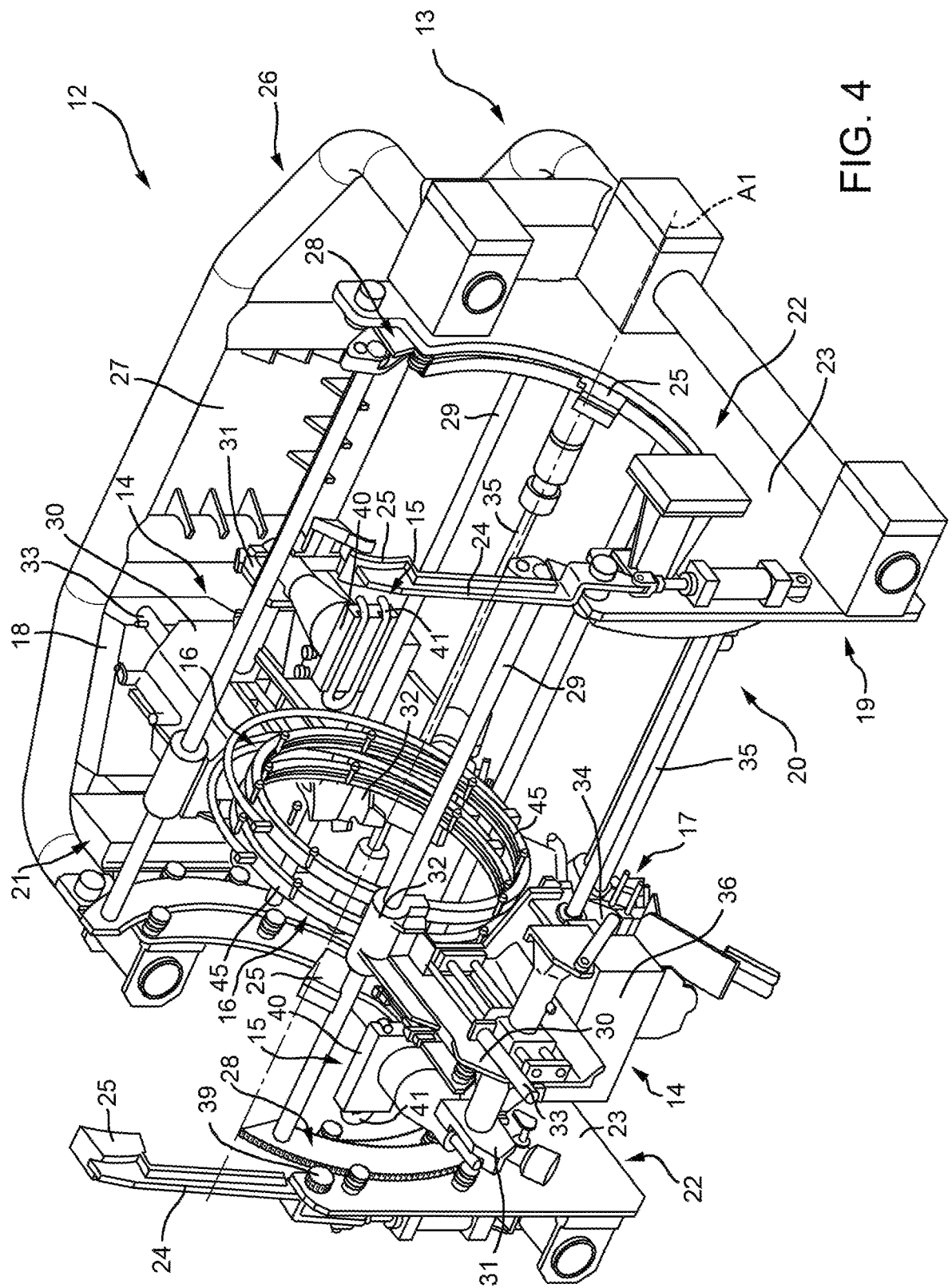
FIG. 4 is a perspective view, with parts removed for clarity, of an apparatus configured to coat the pipeline in FIG. 1 in accordance with a variant of the present disclosure.

FIGS. 1 and 2, reference numeral 1 indicates a pipeline as a whole, which extends along a longitudinal axis A and comprises two pipe sections 2 aligned along the longitudinal axis A. Each pipe section 2 comprises a metal cylinder 3 and a polymer coating 4, usually in polyethylene or polypropylene, which is placed in contact with the metal cylinder 3 and has the function of protecting the metal cylinder 3 from corrosion. Each pipe section 2 has two opposite free ends 5 (only one of which is shown in FIG. 1) without the coating 4, and has a bevel 6 on each free end 5. Two successive pipe sections 2 aligned along the longitudinal axis A are arranged with the free ends 5 facing each other and are welded, possibly in several welding passes, to form an annular welding bead 7 between the two pipe sections 2. The two welded pipe sections 2 define a cutback 8, which extends along the longitudinal axis A between the two successive bevels 6 of the coating 4 and comprises the annular welding bead 7. The pipeline 1 is formed by joining the pipe sections 2. With regard to this description, the term pipeline 1 also means the pipeline in the construction phase, formed, for example, by just two pipe sections 2 joined together.

In addition to the welding of the metal cylinders 3, the joining operation on the pipe sections 2 also provides for forming a coating that connects the pre-existing coatings 4 such that the coating of the pipeline is uninterrupted. This operation envisions forming a protective layer 9 around the cutback 8 and around two end portions 10 of the coating 4 and making the protective layer 9 adhere to the cutback 8 and the end portions 10 of the coatings 4.

Application of the protective layer 9 usually requires preliminary operations of preparing the cutback 8 and the end portions 10 to favour adhesion of the protective layer 9. These operations consist in cleaning, by sandblasting for example, and heating, by induction for example, the cutback 8, and in depositing a thin layer 11 of polymer powder material, a fusion bonded epoxy (FBE) resin for example, on the still hot metal cylinder 3 to form the primer. It is possible to spray a layer of adhesive between layer 11 and the protective layer 9.

The protective layer 9 has a thickness of between 0.1 mm and 7 mm, and is formed by a polymer, such as polyolefins (e.g., a modified polyethylene (CMPE) or a chemically modified polypropylene (CMPP)).

The protective layer 9 has a width wider than the width of the cutback 8 (measured along the longitudinal axis A) so as to overlap the coatings 4 at the respective end portions 10, and a length such as to ensure covering the perimeter of the cutback 8, including overlapping of the end edges of the protective layer 9. The pipeline 1 produced in this manner is suitable for various types of usage, such as underwater ones for example, for the transport of hydrocarbons across sea areas.

In FIG. 3, reference numeral 12 indicates an apparatus configured to heat the cutback 8 and apply polymer powder material on the cutback 8.

The joining operations described for making the pipeline 1 are performed both in on-land plants and on laying vessels.

Apparatus for Applying the First Layer

With reference to FIG. 3, the apparatus 12 is configured to coat the cutback 8 with a first layer 11 (FIG. 2). In greater detail, the apparatus 12 is configured to perform work cycles, each of which envisions: coupling the apparatus 12 to the pipeline 1; heating the cutback 8 to a temperature between 170° C. and 270° C.; applying, in relatively quick succession or simultaneously, the polymer powder material on the still hot cutback 8; and releasing the pipeline 1. In this description the adjective "axial" refers to the longitudinal axis A of the pipeline 1.

The apparatus 12 is configured to be mounted on a manipulator (not shown in the accompanying figures), and comprises: a frame 13, which extends along an axis A1 and is configured to be fixed with respect to the pipeline 1 to arrange axis A1 parallel to the longitudinal axis A of the pipeline 1; and two carriages 14, which are supported by the frame 13 and are movable along axis A1 with respect to the frame 13. Each carriage 14 is configured to support a heater 15 and an applicator 16. In the case shown, the two applicators 16 have an annular shape, are supported by both the carriages 14, and are arranged on opposite sides with respect to the heaters 15.

The apparatus 12 comprises an actuator 17 configured to advance the carriage 14 along axis A1, and a control unit 18 configured to enable the selection of a travel distance for the carriage 14 from a plurality of travel distances.

The frame 13 comprises: a frame portion 19 configured to be fixed with respect to the pipeline 1; a frame portion 20 supported in a rotatable manner about the axis A1 of the frame portion 19; and an actuator 21 to rotate the frame portion 20 with respect to the frame portion 19 about axis A1.

In practice, the carriage 14 is movable along axis A1 and can rotate about axis A1.

The frame portion 19 comprises two opposing heads 22 connected to each other and configured to be arranged around, and clamped to, the pipeline 1.

The apparatus 12 in FIG. 4 differs from that in FIG. 3 in the relative positions of the heaters 15 and the applicators 16, while the reference numerals employed naturally refer to both embodiments.

With reference to FIG. 4, the applicators 16 are positioned alongside one another, while the heaters 15 are arranged on opposite sides with respect to the applicators 16 in the axial direction.

Each head 22 is shaped like an open ring and comprises a U-shaped fixed part 23 and an arm 24 selectively movable between an open and a closed position. The fixed part 23 and the arm 24 comprise spacers 25 configured to be arranged on opposite sides of the cutback 8 so as to place axis A1 substantially coaxial with the longitudinal axis A (FIG. 3).

The frame portion 19 comprises a support structure 26, which is connected to the heads 22 and is configured to keep the heads 22 a designated or given distance apart. The maximum travel distance of the carriage 14 is determined by the distance between the heads 22. The frame portion 19 comprises a coupling 27 for the manipulator and, in particular, the coupling 27 is arranged along the support structure 26.

Frame portion 20 comprises two opposed heads 28 connected to one another by guides 29 (FIG. 4), which in the case shown are rods slidably engaged by the carriage 14.

Figure 5:
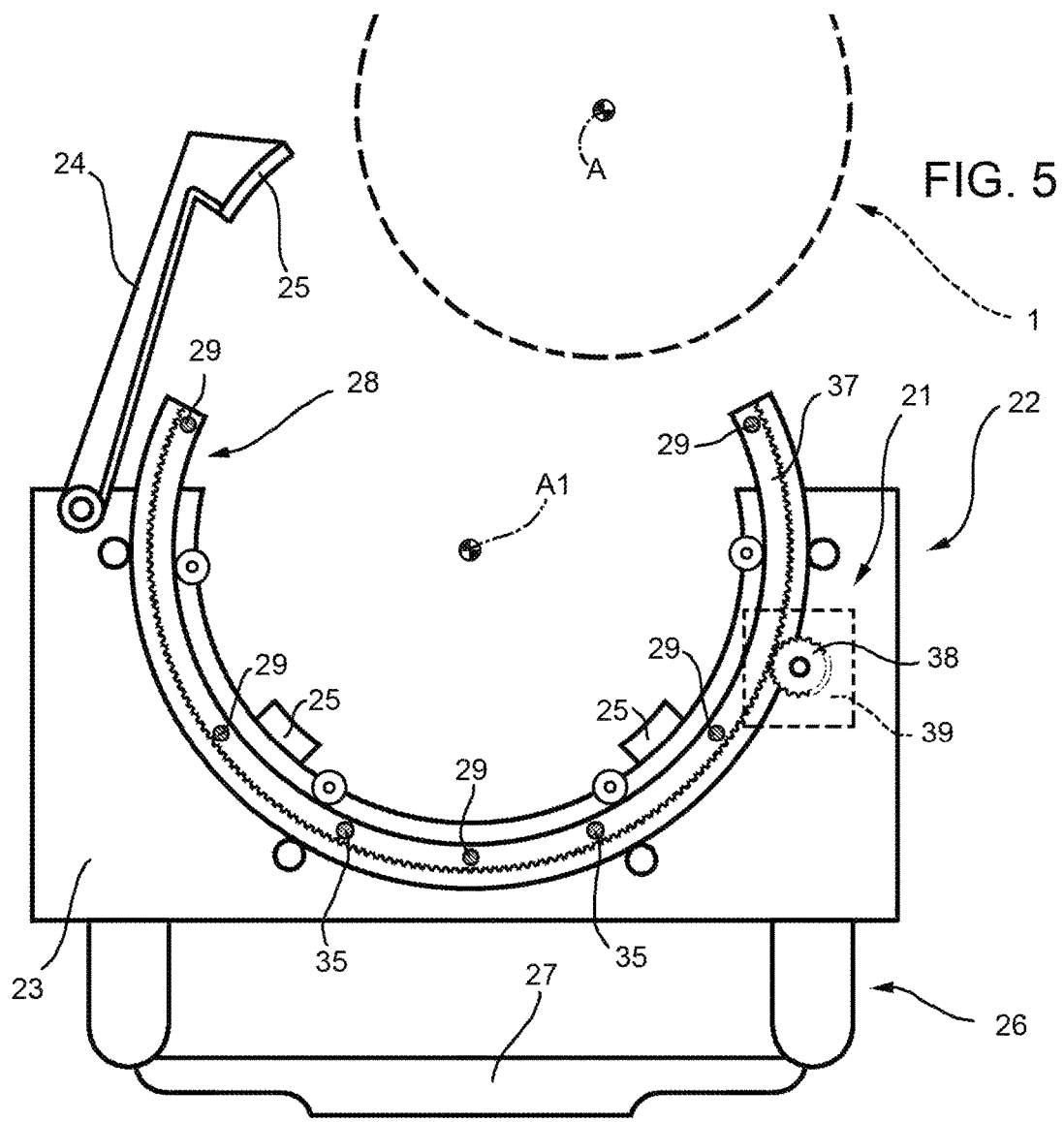
FIG. 5 is a plan view, with parts removed for clarity, of a detail of the apparatus in FIG. 4.

Each head 28 is formed by an open ring, in which the opening of the ring is larger than the diameter of the pipeline 1 (FIG. 5). The carriage 14 comprises: a main body 30; a mounting member 31 configured to support a heater 15; and a mounting member 32 configured to support an applicator 16.

The mounting member 31 is mounted in a selectively movable manner along the main body 30 in a radial direction and configured to adjust the distance of the heater 15 from axis A1. In particular, the main body 30 is substantially defined by a plate and the mounting member 31 is coupled in a sliding manner along this plate and to an actuator 33 configured to control the movement of the mounting member 31.

In accordance with a variant of the present disclosure that is not shown, both of the mounting members are movable in a radial direction with respect to the main body.

The actuator 17 comprises: a nut 34 mounted on the carriage 14; a threaded bar 35 parallel to axis A1 and supported by the frame 13, in particular, by the heads 28; and a motor 36 configured to turn the nut 34.

With reference to FIG. 5, the actuator 21 comprises: an open crown wheel 37 mounted on a head 28; a sprocket wheel 38, which is mounted on the head 22 adjacent to the crown wheel 37 and meshes with the crown wheel 37; and a motor 39 configured to selectively rotate the sprocket wheel 38.

With reference to FIG. 4, the actuator 33 is a linear actuator that, in the case shown, is defined by a hydraulic cylinder.

The heater 15 is a high-frequency electric inductor supplied with alternating current at a high frequency, in particular between 15,000 Hz and 40,000 Hz, more specifically between 20,000 Hz and 30,000 Hz. In the case shown in FIG. 4, the heater 15 has a plate-like shape and comprises a magnetic circuit 40 and a coil 41 of electrically conductive material supported by the magnetic circuit 40.

Figure 6:
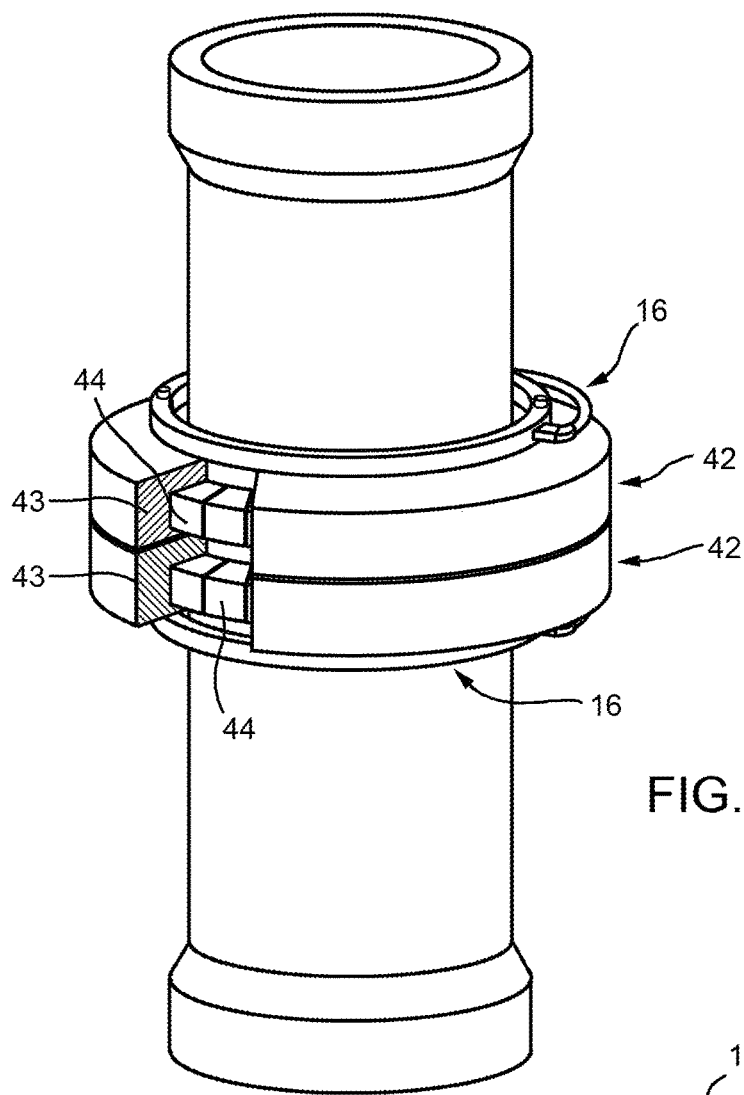
FIG. 6 is a perspective view, with parts in section and parts removed for clarity, of a variant of the apparatus in FIG. 4.

In accordance with the variant in FIG. 6, each heater 15 is replaced with a heater 42 having a toroidal shape and comprising an annular magnetic circuit 43 and at least one coil 44 of electrically conductive material supported by the magnetic circuit 43.

Figure 7:
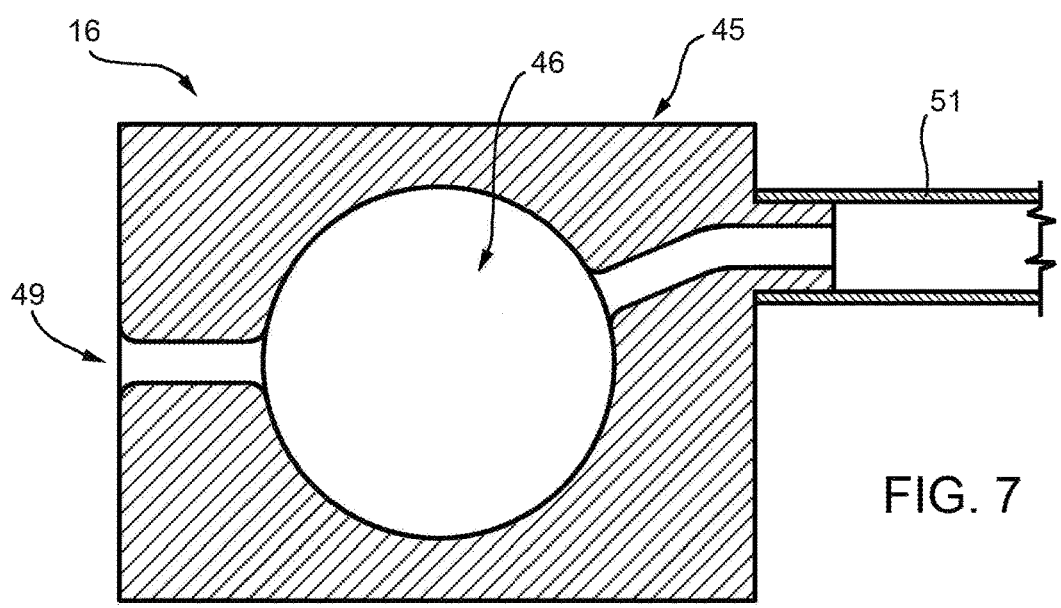
FIG. 7 is a sectional view, with parts in section and parts removed for clarity, of a detail of the apparatus in FIG. 4.

With reference to FIG. 7, each applicator 16 comprises an annular body 45 and a mixing chamber 46, which is formed inside the annular body 45 and is configured to enable the mixing of a polymer powder and air, and the distribution of the mixture in the mixing chamber 46.

Figure 8:
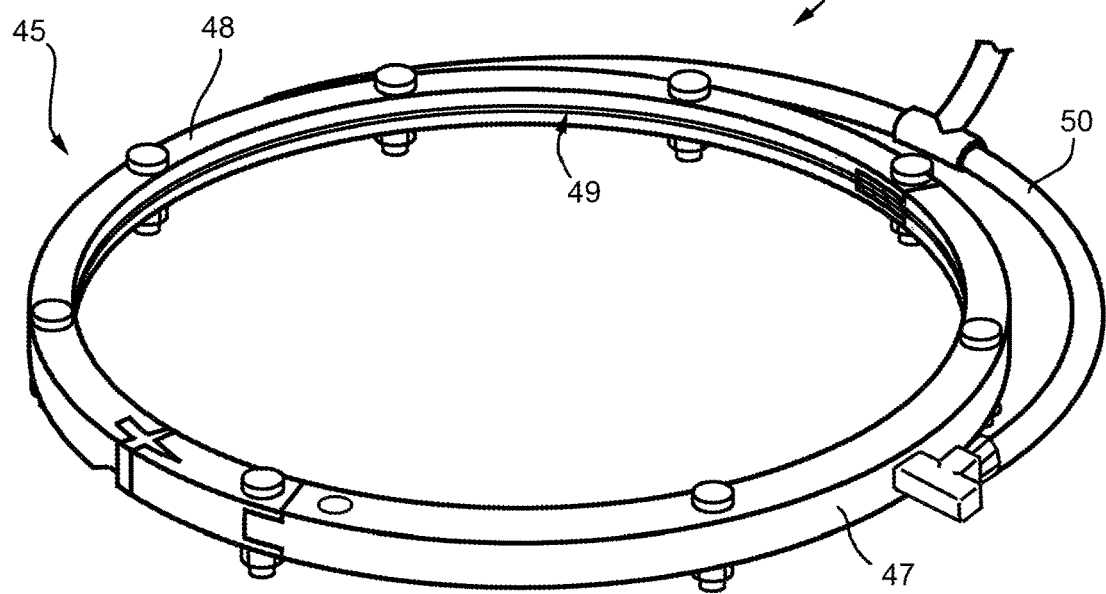
FIG. 8 is a perspective view, with parts removed for clarity, of a detail of the apparatus in FIG. 4.

With reference to FIG. 8, the annular body 45 is formed by at least two complementary parts 47 and 48 that enable mounting the applicator 16 around the pipeline 1.

With reference to FIG. 7, the annular body 45 comprises an annular slit 49 configured to connect the mixing chamber 46 to the outside and form a film of polymer powder directed towards the pipeline 1.

A hose 50 (FIG. 8) is connected to the mixing chamber 46 configured to feed polymer powder and air to the mixing chamber 46.

According to a variant not shown in the accompanying figures, the applicator is defined by a spray gun (i.e., a nozzle), the position of which is adjustable in the radial direction.

With reference to FIG. 4, the control unit 18 is configured to set and control the actuators 17, 21 and 33, the heaters 15 or 42 and the applicators 16. Actuator 17 determines the travel distance and translation speed of the carriage 14 along axis A1. Actuator 21 determines the travel distance and rotational speed of the carriage 14 about axis A1. Actuator 33 adjusts the distance between the mounting member 31 and axis A1. The power and frequency of the heaters 15 or 42 can be adjusted as a function of the position of the heaters 15 or 42 along axis A1 and the planned work cycle. Similarly, the flow of air and polymer powder through the applicators 16 is adjusted as a function of the work cycle.

The movement of the carriage 14 is determined by the composition of the translation of the carriage 14 along axis A1 and the rotation of the carriage 14 about axis A1. This composition can be created in a plurality of different variants.

In accordance with certain embodiments of the disclosure, the apparatus 12 comprises two carriages 14, which are mounted on the same guides 29 and are arranged facing each other. Each carriage 14 is equipped with a heater 15 and an applicator 16. In particular, both of the carriages 14 support two applicators 16 on two facing sides.

In addition to the combination of annular applicators with plate heaters and annular applicators with annular heaters, the described apparatus enables combining plate heaters with spray guns and/or annular heaters with spray guns.

Furthermore, each carriage is able to independently support a respective heater and a respective applicator, and is able to move independently of the other carriage.

In accordance with a further variant, the apparatus comprises only one carriage having only one heater and only one applicator.

Finally, it should be appreciated that variants can be made regarding the present disclosure with respect to the embodiments described with reference to the accompanying figures without departing from the scope of the claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A pipeline coating apparatus configured to coat a cutback along a pipeline, the pipeline coating apparatus comprising:

a frame extending along a designated axis, the frame being fixable with respect to the pipeline to arrange the designated axis parallel to a longitudinal axis of the pipeline;

a carriage supported by the frame and movable along the designated axis with respect to the frame, the carriage supporting an induction heater and an applicator;

a first actuator configured to advance the carriage along the designated axis; and a control unit configured to select, from a plurality of travel distances, a travel distance for the carriage to travel to sequentially heat, via the induction heater, an outer surface of the pipeline and then apply, via the applicator, a powder coating to the heated outer surface of the pipeline.

2. The pipeline coating apparatus of claim 1, wherein the frame comprises:

a first frame portion fixable with respect to the pipeline;

a second frame portion rotatably supported about the designated axis by the first frame portion; and a second actuator configured to rotate the second frame portion with respect to the first frame portion about the designated axis.

3. The pipeline coating apparatus of claim 2, wherein the first frame portion comprises two first opposing heads connected to one another, the two first opposing heads being arrangeable around, and clampable to the pipeline.

4. The pipeline coating apparatus of claim 3, wherein each head comprises a fixed part and an arm hinged to the fixed part and selectively movable between an open and a closed position.

5. The pipeline coating apparatus of claim 3, wherein the first frame portion comprises a support structure connected to the two first opposing heads and configured to keep the two first opposing heads a designated distance apart.

6. The pipeline coating apparatus of claim 2, wherein the first frame portion comprises a coupling for a manipulator.

7. The pipeline coating apparatus of claim 2, wherein the second frame portion comprises two second opposing heads connected to one another by a plurality of guides which are slidably engaged by the carriage.

8. The pipeline coating apparatus of claim 7, wherein each second head has an open ring shape fittable to the frame around the pipeline.

9. The pipeline coating apparatus of claim 1, wherein the carriage comprises:

a main body;

a first mounting member configured to support at least one of the induction heater and the applicator; and a second mounting member configured to support at least one of the applicator and the induction heater.

10. The pipeline coating apparatus of claim 9, wherein at least one of the first mounting member and the second mounting member are selectively movableably mounted along the main body in a radial direction with respect to the designated axis.

11. The pipeline coating apparatus of claim 1, wherein the first actuator comprises a nut mounted on the carriage and a threaded bar supported by the frame.

12. The pipeline coating apparatus of claim 1, wherein the induction heater operable at an alternating current at a frequency of between 15,000 Hz and 40,000 Hz.

13. The pipeline coating apparatus of claim 1, wherein the induction heater comprises a plate-shaped induction heater comprising a magnetic circuit and at least one coil of electrically conductive material supported by the magnetic circuit.

14. The pipeline coating apparatus of claim 1, wherein the induction heater comprises a toroid-shaped induction heater comprising an annular magnetic circuit and at least one coil of electrically conductive material supported by the magnetic circuit.

15. The pipeline coating apparatus of claim 1, wherein the applicator is mounted on the carriage and comprises an annular body and a mixing chamber defined inside the annular body, the applicator configured to enable a mixing of a polymer powder and air, and a distribution of the mixture along the mixing chamber.

16. The pipeline coating apparatus of claim 15, wherein the annular body is formed by at least two complementary parts movable between a closed position and an open position to enable mounting the applicator around the pipeline.

17. The pipeline coating apparatus of claim 15, wherein the annular body comprises an annular slit configured to connect the mixing chamber to an outside area and form a film of polymer powder.

18. The pipeline coating apparatus of claim 15, wherein a hose is connected to the mixing chamber and configured to feed polymer powder and air to the mixing chamber.

19. The pipeline coating apparatus of claim 1, wherein the control unit is configured to set and control the selected travel distance for the carriage and a plurality of operation cycles and rest cycles of the induction heater and the applicator.

20. The pipeline coating apparatus of claim 1, further comprising two carriages, wherein each carriage is provided with one induction heater and one applicator.

21. The pipeline coating apparatus of claim 20, wherein the two carriages support at least one of both induction heaters and both applicators on opposite sides of the designated axis.

* * * * *